United States Patent
Neill et al.

(10) Patent No.: US 11,829,334 B2
(45) Date of Patent: Nov. 28, 2023

(54) PER ROW DATABASE RESYNCHRONIZATION

(71) Applicant: International Business Machines Corporation, Armonk, NY (US)

(72) Inventors: Matthew A Neill, Rochester, MN (US); Mark J. Anderson, Oronoco, MN (US); Craig S. Aldrich, Rochester, MN (US); Donald Frederick Zimmerman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 16/899,874

(22) Filed: Jun. 12, 2020

(65) Prior Publication Data

US 2021/0390081 A1 Dec. 16, 2021

(51) Int. Cl.
| | | |
|---|---|---|
| *G06F 16/178* | (2019.01) | |
| *G06F 16/17* | (2019.01) | |
| *G06F 11/30* | (2006.01) | |
| *G06F 16/22* | (2019.01) | |
| *G06F 9/30* | (2018.01) | |

(52) U.S. Cl.
CPC ........ *G06F 16/178* (2019.01); *G06F 9/30189* (2013.01); *G06F 11/3034* (2013.01); *G06F 16/1734* (2019.01); *G06F 16/2282* (2019.01)

(58) Field of Classification Search
CPC .............. G06F 16/178; G06F 9/30189; G06F 11/3034; G06F 11/1658; G06F 11/1662; G06F 11/1675; G06F 11/2074; G06F 11/2076; G06F 11/2082; G06F 16/1734; G06F 16/2282; G06F 16/27; G06F 16/273; G06F 16/275; G06F 16/278; G06F 2201/855; G06F 2201/80; G06F 11/1448; G06F 11/1469; G06F 11/2097; G06F 11/2094

See application file for complete search history.

(56) References Cited

U.S. PATENT DOCUMENTS

| | | | |
|---|---|---|---|
| 6,098,075 A * | 8/2000 | Becraft, Jr. | ........... G06F 16/284 |
| 7,788,225 B2 | 8/2010 | Fish et al. | |
| 8,380,663 B2 | 2/2013 | Thode | |
| 9,128,974 B2 * | 9/2015 | Konagolli Suresh | ....................... G06F 16/273 |
| 9,959,178 B2 | 5/2018 | Lee et al. | |

(Continued)

OTHER PUBLICATIONS

Anderson, Mark J., "Resynchronization," IBM, Jun. 21, 2019, 6 pages, https://www.ibm.com/support/knowledgecenter/en/ssw_ibm_i_74/db2mi/db2mresync.htm.

(Continued)

*Primary Examiner* — Tamara T Kyle
*Assistant Examiner* — Lana Alagic
(74) *Attorney, Agent, or Firm* — Peter J. Edwards

(57) ABSTRACT

A method of controlling resynchronization of a source database and a target database may comprise detecting that a connection between the source database and the target database has been restored. Based on the detecting, the method may also comprise identifying a first edit flag for a first row in a first table on the source database. Based on the identifying, the method may also comprise sending the first row from the source database to the target database. Based on the sending, the method may also comprise clearing the first edit flag for the first row.

20 Claims, 4 Drawing Sheets

(56) References Cited

U.S. PATENT DOCUMENTS

| | | | |
|---|---|---|---|
| 2003/0182327 A1* | 9/2003 | Ramanujam | G06F 16/273 |
| 2004/0034643 A1* | 2/2004 | Bonner | G06F 16/2282 |
| 2007/0016627 A1* | 1/2007 | McCaw | G06F 16/27 |
| 2008/0109494 A1* | 5/2008 | Chitre | G06F 16/27 |
| 2008/0109496 A1* | 5/2008 | Holenstein | G06F 16/2343 |
| 2008/0250073 A1* | 10/2008 | Nori | G06F 16/2358 |
| 2010/0153346 A1 | 6/2010 | Thode | |
| 2014/0081907 A1* | 3/2014 | Tran | G06F 16/27 707/E17.005 |
| 2014/0317055 A1* | 10/2014 | Agrawal | G06F 16/273 707/627 |
| 2015/0269030 A1* | 9/2015 | Fisher | G06F 16/285 707/692 |
| 2019/0188309 A1* | 6/2019 | Anderson | G06F 3/065 |
| 2019/0220466 A1 | 7/2019 | Freiberg et al. | |
| 2019/0392051 A1* | 12/2019 | Damyanov | G06F 16/278 |
| 2020/0125660 A1* | 4/2020 | Shuma | G06F 16/2358 |
| 2020/0341968 A1* | 10/2020 | Mohan | G06F 16/27 |

OTHER PUBLICATIONS

Anderson, Mark J., "Resynchronization best practices," IBM, Jun. 21, 2019, 1 page, https://www.ibm.com/support/knowledgecenter/en/ssw_ibm_i_74/db2mi/db2mresyncbestpractices.htm.

Anderson, Mark J., Resynchronization services, IBM, Jun. 21, 2019, 1 page, https://www.ibm.com/support/knowledgecenter/en/ssw_ibm_i_74/db2mi/db2mservicesresync.htm.

Anderson, Mark J., "Resync_Status view," IBM, Jun. 21, 2019, 10 pages, https://www.ibm.com/support/knowledgecenter/en/ssw_ibm_i_74/db2mi/db2mviewresyncstatus.htm.

Anderson, Mark J., "Resynchronization processing," IBM, Jun. 21, 2019, 7 pages, https://www.ibm.com/support/knowledgecenter/en/ssw_bm_i_74/db2mi/db2mresyncprocess.htm.

* cited by examiner

PER ROW DATABASE RESYNCHRONIZATION

STATEMENT REGARDING PRIOR DISCLOSURES BY THE INVENTOR OR A JOINT INVENTOR

The following disclosure(s) are submitted under 35 U.S.C. 102(b)(1)(A):

Resynchronization, Mark J. Anderson, Jun. 21, 2019, 9 pages, available at https://www.ibm.com/support/knowledgecenter/en/ssw_ibm_i_74/db2mi/db2mresync.htm; Resynchronization best practices, Mark J. Anderson, Jun. 21, 2019, 3 pages, available at https://www.ibm.com/support/knowledgecenter/en/ssw_ibm_i_74/db2mi/db2mresyncbestpractices.htm; Resynchronization services, Mark J. Anderson, Jun. 21, 2019, 4 pages, available at https://www.ibm.com/support/knowledgecenter/en/ssw_ibm_i_74/db2mi/db2mservicesresync.htm; RESYNC_STATUS view, Mark J. Anderson, Jun. 21, 2019, 12 pages, available at https://www.ibm.com/support/knowledgecenter/en/ssw_ibm_i_74/db2mi/db2mviewresyncstatus.htm; Resynchronization processing, Mark J. Anderson, Jun. 21, 2019, 12 pages, available at https://www.ibm.com/support/knowledgecenter/en/ssw_ibm_i_74/db2mi/db2mresyncprocess.htm.

BACKGROUND

The present disclosure relates to database systems, and more specifically, to replicated database systems.

Databases can be used to provide access to data to multiple users and systems. Users, computers, and computer programs (sometimes collectively referred to herein as database "clients") read from databases to gain information necessary for that user, computer, or computer program to perform assigned functions. Further, some clients write to databases to store information therein. A database may be located in close geographic proximity to a client, such as in the same building, or geographically distant from a client, such in another state or country. A client may be directly connected to a database (e.g., through a single network cable) or indirectly connected to a database (e.g., though the Internet).

SUMMARY

Some embodiments of the present disclosure can be illustrated as a method of controlling resynchronization of a source database and a target database. The method comprises detecting that a connection between the source database and the target database has been restored. The method further comprises identifying a first edit flag for a first row in a first table on the source database based on the detecting. The method further comprises sending the first row from the source database to the target database based on the identifying. Finally, the method comprises clearing the first edit flag for the first row based on the sending.

Some embodiments of the present disclosure can be illustrated as a system comprising a processor and a memory in communication with the processor. The memory contains program instructions that, when executed by the processor, are configured to cause the processor to perform the above method of controlling resynchronization of a source database and a target database.

Some embodiments of the present disclosure can be illustrated as a computer program product that comprises a computer readable storage medium having program instructions embodied therewith. The program instructions are executable by a computer to cause the computer to perform the steps of the above method of controlling resynchronization of a source database and a target database.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
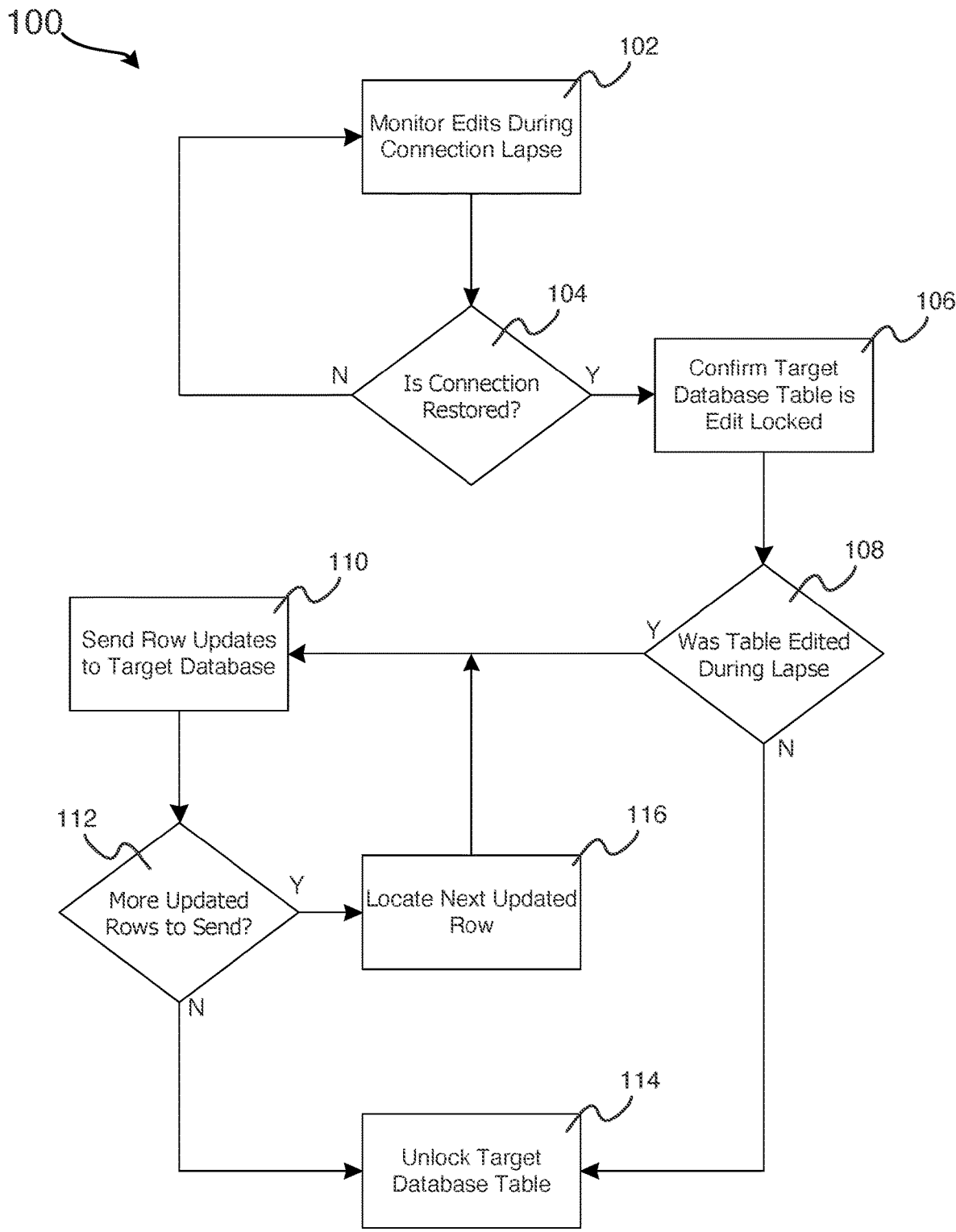
FIG. 1 depicts an example method of performing monitoring during a connection lapse and per-row resynchronization after connection restoration, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database systems, and more specifically, to replicated database systems. While the present disclosure is not necessarily limited to such applications, various aspects of the disclosure may be appreciated through a discussion of various examples using this context.

Databases can be used in a variety of applications in a variety of industries, but a common use of databases is to store a large amount of data that is regularly accessed. Entities accessing a database may be referred to herein as a "client" of a database, and may include, for example, a user, a computer system, or a program running on a computer system. Databases may provide a central repository for information, which may be useful to prevent unnecessary duplication of information that is needed by many clients. This may be particularly beneficial when that information takes up a large amount of storage space or is sensitive (e.g., confidential, or privileged). In these instances, storing this information locally for all clients who may require the information may be costly, time consuming, or both.

In some use cases, clients require very frequent and very reliable access to the information in a database. For example, some industries determine, in real time, prices for products and services based on weather data, stock-market activity, and available supply. Developing a price for a product in these industries may involve analyzing a large amount of information in one or more databases several times in a 24-hour period. In some use cases, the clients that require this regular access may be located in different geographic areas, such that it is infeasible for all clients to connect directly to a single physical database (i.e., to connect to a single database without going through a remote connection, such as the Internet). Sometimes, the clients may connect to the database through a remote connection. This may, in some situations, enable all clients to access the same information without providing each client with a copy of that information. Further, because there is only one single physical database, there is only one copy of the information to maintain and update. For that reason, it is relatively simple to assure that each client that accesses the information is accessing up-to-date information.

However, in some instances a connection between a database and one or more geographically remote clients may be interrupted. For example, the connection between the internet and the database and a client or group of clients could be interrupted, causing that client or group of clients to be without access to the information in the database until the connection is restored. If the client or group of clients rely on the information in the database to perform normal functions, the client or group of clients may be incapable of operating as intended until the connection is restored. This may result in, for example, a computer system that uses weather data to predict energy demand over the next 20 minutes to be incapable of predicting energy demand.

In some cases, a lapse of the connection between a database and a client can lead to lost revenues or safety issues. For example, some commodity or stock traders may be unable to make informed decisions without access to databases that provide information regarding related commodities or markets. Further, some companies may be unable to accurately determine an optimal price for goods or services at the time of a transaction if that company is unable to access a database with information that affects the work/cost required to provide that good or service.

To prevent issues related to loss of connection to a database, some industries make use of database replication (also referred to herein as "database mirroring"). In database replication, two or more physical instances of a database are maintained and stored in different locations for different groups of users. For example, an organization with 50% of its workforce in Europe and 50% of its workforce in North America may maintain a first instance of a database in Europe and a second instance of the database. In North America. These instances may contain the same data, and may be referred to herein as "mirror copies." In this example, the employees at each location may maintain access to the database information even if the connection between the two cites is temporarily broken (i.e., if the connection lapses).

In some embodiments of database replication, updates to the data may occur at either database and be sent to the other database to bring the "other" database in sync with the first database. In other words, changes at either database are replicated to the other database. In some uses of database replication, one database may be referred to as the "source" database and one database may be referred to as the "target" database. In some such use cases, most edits may occur at a source database and be replicated at a target database, but edits at either a source database or a target database may be replicated to the other database.

When a connection between a source database and one or more target databases is broken, however, the target databases may be locked to prevent conflicting edits to the databases. In other words, the target edit lock during a connection lapse may prevent a first client from altering field 1 from $20 to $40 in a target database in spite of a second client altering field 1 from $20 to $23 in the source database. If the edit in the target database were not prevented, the two edits would conflict when the connection was restored. Even if $40 were the correct, current value for field 1, the value from the source database ($23) may overwrite the target database, causing the wrong data to be retained.

Similarly, a target edit lock could also prevent the loss of a row that was inserted into the database during a connection lapse. For example, a first client may insert a new row pertaining to a first transaction in a source database during a connection lapse and a second client may insert a new row pertaining to a second transaction in a target database during a connection lapse. In this situation, the new rows may be placed in the next open row slot in the databases. This next open row slot may be the same slot in both databases (e.g., empty row 440). This would result in two databases having different data in that same row slot (i.e., row 440 would contain data pertaining to the first transaction in the source database and data pertaining to the second transaction in the target database). Thus, when connection between the two databases was restored, the values for the row would conflict, and one row may overwrite the other row, causing all data pertaining to one of the transactions to be lost.

In some uses of database replication, edits to a source database may be allowed during periods of connection lapse. In these uses, edits to the source database before the connection is restored would result in the source database and the target database being out of sync. To mitigate the potential negative effects of clients of the target database using outdated data, edits made to the source database during a connection lapse are populated to the target database (or target databases) quickly once the connection is restored. This is referred to as bringing the databases back in sync, or "resynchronization," and the period during which it occurs is sometimes referred to as the "resynchronization period." Once resynchronization is complete, the target database (or simply the table being resynchronized) can be unlocked and the two databases can resume normal replication.

In typical database mirroring, the data that is being resynchronized is locked on both the source and target databases until resynchronization is complete. However, in typical database mirroring, resynchronization occurs on a file-by-file basis, and thus entire files (also referred to herein as "tables") on the source database may be locked at once. Resynchronization of those files often requires analyzing each field of the data in the source database and comparing it to the corresponding field in the target database to detect changes. Sometimes, this can also require comparing the databases to determine whether any rows, columns, or fields have been added in the source database. Unfortunately, because some mirrored databases (and the files therein) can be very large, comparing the source database to the target database can require large amounts of time and resources (e.g., 30 minutes). This can increase the amount of time that clients are unable to edit the source or target database by a large amount of time, which may negatively impact the accuracy of calculations and decisions that rely upon real-time data normally maintained in those databases.

Some embodiments of the present disclosure address some of the above issues by performing resynchronization of mirrored databases on a per-row basis, rather than a per-file basis. By organizing resynchronization with this added granularity, resynchronization can be performed faster and less intrusively. In some embodiments of the present disclosure, increased monitoring of client edits to a source database during connection lapse and resynchronization may be performed to facilitate per-row resynchronization.

For example, in some embodiments of the present disclosure, edits to a database during a connection lapse may be monitored and recorded on a per-row basis. An edit to a row (e.g., an insert, deletion, or modification) in a source database during connection lapse may be recorded, for example, as a metadata flag associated with that row (e.g., a bit that can be switched from "0" to "1" when a client edits the row) or a column in the row itself (e.g., a field in the row that can be switched from "unedited" to "edited" when a client edits the row). When resynchronization of a table is started, the system managing resynchronization (sometimes referred to herein as a "resynchronization controller") may scan the table for recorded edits (e.g., for "1" metadata flags or fields containing "edited") and perform resynchronization on only rows for which edits have been recorded. In some embodiments, rows without edits may thus be skipped, which may result in the overall resynchronization process occurring far more quickly.

For example, upon the start of per-row resynchronization, a resynchronization controller may locate the first updated row in the table by determining whether an edit flag for each row contains a "1" (or, in other examples, "edited," "yes," "true," or others). In some embodiments, this may include identifying the value of the edit flag for every row in the table (for example, by analyzing the an "edited" field in the first row, then the second row, and so on). For each row that is edited, the resynchronization controller may send the row data to the target database, causing the source database and the target database to be synchronized for that row. This may prevent a need for the resynchronization controller to compare the data of every row in the source-database table to the data of the corresponding rows in the target-database table to identify edited rows, potentially saving considerable resynchronization time.

In some embodiments, a resynchronization controller may also maintain a record of the number of rows that have been edited during connection lapse. For example, some embodiments may maintain an overall counter for an entire table, and sub counters for portions of the entire table (for example, for partitions of a table or logical groups of very large tables). This record may be referred to herein as an "edit counter" or "primary edit counter." Once resynchronization has begun, this edit counter may be utilized to achieve several efficiencies. For example, a resynchronization controller may analyze an edit counter of a table (referred to herein as a "table edit counter") to determine how many rows in that table were edited during connection lapse. Similarly, a resynchronization controller could analyze the edit counters for each partition table in an overall table to determine how many rows in each partition table were edited during connection lapse. In this way, a resynchronization controller may quickly identify partition tables or entire tables that were not edited during connection lapse. By quickly identifying an entire table, for example, that was not edited, the resynchronization controller can determine to skip resynchronization of that table before scanning the data in the table. In some instances, this can significantly speed up the overall resynchronization process.

In some embodiments of the present disclosure, a primary edit counter may also enable a resynchronization controller to determine when all edits made to a source table (or portion of a source table) have been sent to a target database during resynchronization. For example, an edit counter for a table may inform a resynchronization controller that 20 edits have been made to a table. If the resynchronization controller has sent all 20 of those edits to a target database by the time the resynchronization controller has analyzed the first 50% of the table's rows, the resynchronization controller may cease resynchronization of the target database at that point, saving the time and resources that would otherwise be necessary to analyze the remaining 50% of the table's rows.

In some embodiments, a primary edit counter may also provide an estimate for the amount of time remaining in a resynchronization process. For example, if a primary edit counter for a partition table reports 500 edited rows, and the resynchronization controller has edited 250 of those rows, the resynchronization controller may be able to provide an estimate to database clients that it is 50% finished with resynchronizing the table.

In some embodiments of the present disclosure, locking of the source database during resynchronization is also performed on a per-row basis. In other words, a resynchronization controller may not place an edit lock an entire source table that is being resynchronized, but may only place an edit lock on the row that is currently being analyzed or sent to the target database. For example, if a resynchronization controller determines that row 1,024 of a table has an "edited" flag, the resynchronization controller may lock that row, preventing a client from editing the row. The resynchronization controller may unlock the row after it has been sent to the target database. However, the resynchronization controller may not prevent a client from editing for 1,023, 1,025, or any other row of the source-database table while row 1,024 is locked. This may significantly increase a client's ability to edit a row during resynchronization.

Because some client edits to a source database table during resynchronization may be possible in some embodiments, some embodiments of the present disclosure may also speed up the resynchronization process by attempting to send those edits to the target database in real time, in the same way that they would be sent during normal replication. This may avoid those edits slowing down resynchronization, and avoid a delay of those edits being reflected in the target database. Further, if edits during resynchronization modify a row that was previously edited during the connection lapse, successfully sending the new edits to the row would cause the row to be synchronized between the source database and target database. This would enable the edit flag corresponding to the row to be removed, as the row would no longer need to be resynchronized.

FIG. 1 depicts an example method 100 of performing monitoring during a connection lapse and per-row resynchronization after connection restoration, in accordance with embodiments of the present disclosure. Method 100 may be performed by a resynchronization controller that is managing a set of two or more replicated databases. This resynchronization controller may take the form of a computer system such as computer system 400, or a more specialized system.

Method 100 begins in block 102, in which edits to a source database are monitored during a connection lapse. For example, a resynchronization controller may detect a lapse in a connection between a source database and target database and begin to record edits to the rows of the source database. In some embodiments, recording edits may include marking an edit flag for particular row when a client edits (e.g., inserts, deletes, or modifies) that row. This edit flag may take the form of a metadata flag associated with the row, or a cell in the row. In some embodiments, recording edits may also include incrementing one or more primary edit counters for a table (or portion of a table) for each row that is edited during the connection lapse. For example, a large table may contain 1,000,000 rows, and be divided, for efficiency purposes, into sub tables (e.g., partition tables) of 10,000 rows. In this example, the table may contain a primary table-edit counter that records the number of rows edited throughout the entire 1,000,000 row table, and each sub table may contain a primary sub-table-edit counter that records the number of rows edited throughout the corresponding 10,000 rows. More details on monitoring edits during a connection lapse are provided in method 200 of FIG. 2.

In block 104, the resynchronization controller determines whether a connection between the source database and the target database is restored. If the connection is not restored, the resynchronization controller continues to monitor edits in block 102. If the resynchronization controller determines that the connection is restored, however, the migration controller proceeds to block 106, in which the controller confirms that the target database table is edit locked. In other words, the migration controller confirms that database clients are prevented from making edits to the rows of the target database table during resynchronization. In typical embodiments, a target database table should be locked when the connection between the source and target database lapses, and therefore block 106 may not be necessary in some embodiments. However, in some embodiments confirming that the target database is still locked may ensure that unwanted edits in the target database table during resynchronization do not occur.

Further, in some embodiments block 106 may also include preparing the target database for per-row resynchronization. This may be beneficial in some embodiments because per-row resynchronization includes updating a table in the target database one row at a time, per-row resynchronization may include updates that would not be permitted during a standard resynchronization process. For example, if the values of a field in two rows (e.g., rows 200 and 500) were switched in the source database, per-row resynchronization may first change the value of the field in row 200 in the target database such that it temporarily has the same value as the field in row 500 of the target database. However, some database tables enforce unique key indexes, which prevents the values of particular fields from being equal between two rows. In other words, the per-row synchronization edit of row 200 in the target database would not be allowed because it would temporarily cause row 200 and row 500 to have the same value in a field. Thus, in this example, block 106 may also include temporarily blocking the enforcement of unique key indexes in the target database.

Once it is confirmed in block 106 that the target database table is edit locked, the resynchronization controller proceeds to determine, in block 108, whether the table was edited during the connection lapse. In some embodiments, for example, this may be performed by scanning the rows of the table for an edit flag that was recorded in block 102. In some embodiments, this may take the form of analyzing a list of metadata flags that correspond to rows of the database. This list may, for example, have an entry for each row for which an edit was monitored in block 102. In some embodiments, therefore, a resynchronization controller may determine that the table was not edited once it scans all rows of a table and identifies zero edit flags. In some embodiments, a resynchronization controller may determine that the table was not edited by determining that a list that would otherwise contain edit metadata flags is empty. Alternatively, a resynchronization controller may determine that a table was edited by identifying an edit flag in a table row or in a list of metadata flags.

In some embodiments, block 108 may also be performed by analyzing an edit counter for the table. If the edit counter is empty (e.g., displays a "0" value), the resynchronization controller could conclude that the table was not edited. If the edit counter is not empty, however, the resynchronization controller could determine that at least one row in the table was edited.

If the resynchronization controller determines, in block 108, that the table was not edited during the connection lapse, the resynchronization controller proceeds to block 114, in which the target database is unlocked and resynchronization ends. At this point, normal client edits and replication of the two database tables could resume.

However, if the resynchronization controller determines that a row in the table was edited, the updates for that row are sent to the target database in block 110 to populate the edits to the corresponding table in the target database. In some embodiments, this may involve sending the entire row from the source database to replace the corresponding row in the target database. In typical embodiments, block 110 would also include locking the located row in the source database, preventing a database client from editing the row while it is being resynchronized. However, in many use cases, this edit lock would be very short (e.g., less than 1 second), and thus may be unnoticed by a database client.

Once the updates for the row that was located in block 108 are sent to the target database in block 110, the resynchronization controller determines, in block 112, whether there are more updated rows to resynchronize in the source-database table (or sub table). Similar to block 108, this may take the form of, for example, of reviewing a list of edit flags recorded in block 102 (for example, scanning a column of the table for any additional rows that express the "edited" value, or scanning a list of metadata flags that provide row identifiers corresponding to the edited rows of the table). In some embodiments, this may also take the form of reviewing an edit counter for the table or sub table and comparing the total number of edits counted in block 102 to the total number of edits that have been sent to the target database.

If the resynchronization controller determines, in block 112, that there are more updated rows to send to the target database, the resynchronization controller locates the next updated row in block 116. Locating the next updated row may include, for example, scanning the remaining rows of the database for a row that displays an edit flag, or identifying the row corresponding to the next edit metadata flag in a list of edit flags. At this point, blocks 110 and 112 would then be repeated. However, if the resynchronization controller determines that there are no more rows to be resynchronized, the resynchronization controller ends resynchronization in block 114 and unlocks the target database table. At this point, normal client edits and replication of the two databases can resume.

In some use cases, awareness of client edits between connection lapse and resynchronization completion can be used to increase the efficiency of per-row resynchronization. For this reason, some embodiments of the present disclosure monitor client edits both during connection lapse and resynchronization, and record those monitored edits in multiple different ways. The records of those edits can then be used throughout per-row resynchronization to increase the likelihood that all client edits are synchronized. In these embodiments, the efficiencies of per-row resynchronization may be combined with the thorough synchronization of per-file synchronization.

Figure 2:
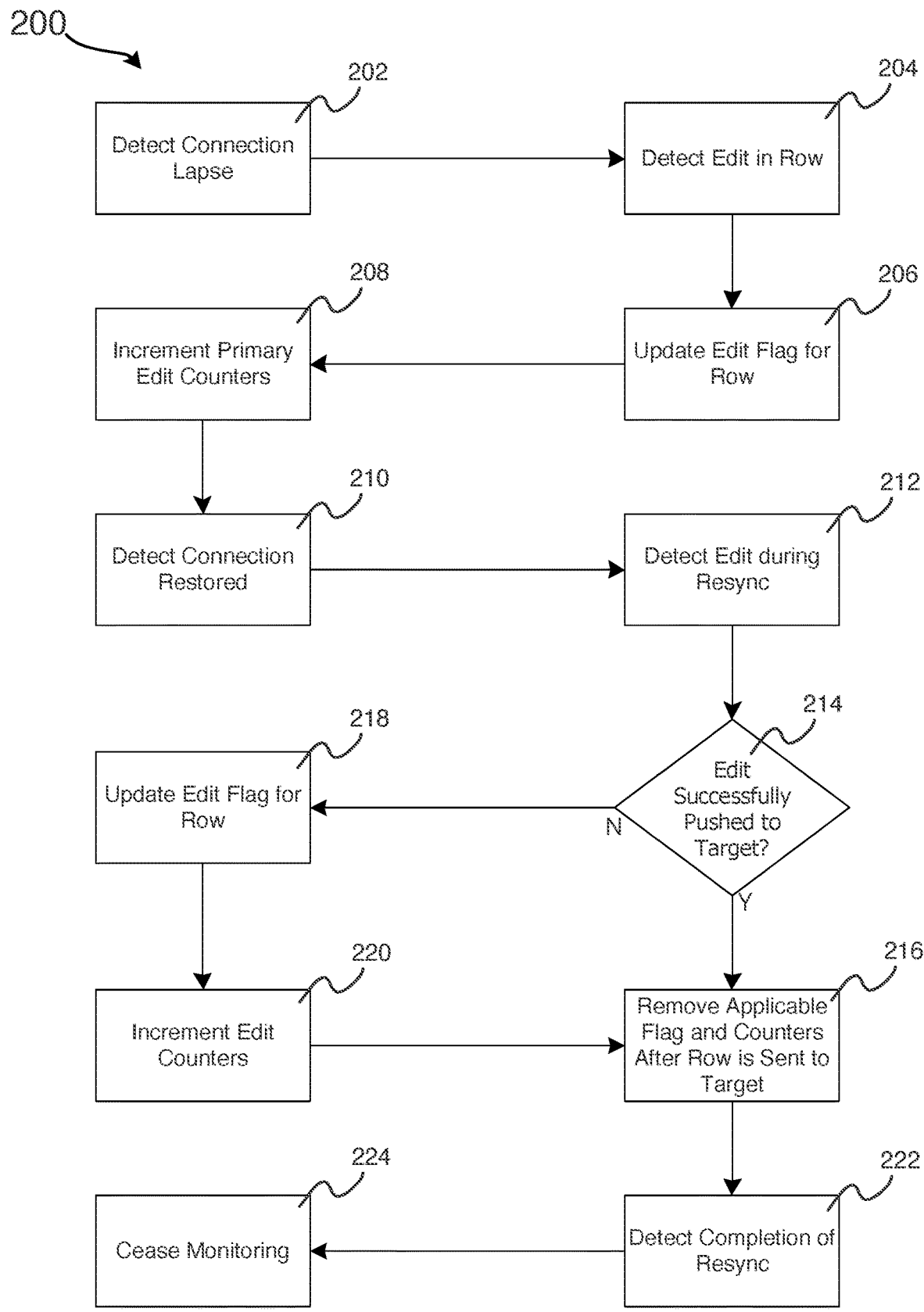
FIG. 2 depicts an example method of monitoring client edits during a connection lapse and during per-row resynchronization after connection restoration, in accordance with embodiments of the present disclosure.

FIG. 2 depicts an example method 200 of monitoring client edits during a connection lapse and during per-row resynchronization, in accordance with embodiments of the present disclosure. Similar to method 100, method 200 may be performed by a resynchronization controller that is managing a set of two or more replicated databases. This resynchronization controller may take the form of a computer system such as computer system 400, or a more specialized system. In some embodiments, the resynchronization controller that performs method 200 may be the same, or a different component that performs other aspects of per-row resynchronization, such as some of the operations of methods 100 of FIG. 1 and 300 of FIG. 3.

For the ease of understanding, method 200 presents an example scenario in which two client edits to a source database between a connection lapse and the completion of resync are monitored and recorded. The first edit is monitored and recorded during the connection lapse, and the second edit is monitored and recorded during per-row resynchronization. The discussion of method 200 will use only these two edits as examples, but typical uses of per-row resynchronization may involve a significantly higher number of client edits.

Method 200 begins in block 202, when a resynchronization controller detects a connection lapse between a source database and a target database. This may occur, for example, if a periodic ping between the source database and the target database does not reach its destination (i.e., the target or the client), if a client edit to the source database fails to replicate to a target database, or if the resynchronization controller is informed that the connection has lapsed by another component. At this point, the resynchronization controller determines to begin monitoring client edits to the source database in preparation for per-row resynchronization.

Upon monitoring, the resynchronization controller detects a client edit on a particular row in block 204. This edit, for example, may take the form of a row insert, a row deletion, or a row modification. There are several methods by which an edit to the particular row may be detected that are compatible with method 200. In some embodiments, for example, the method by which the edit is detected may be the same or similar to the method by which edits are detected in typical replication operations.

In block 206, the detected edit is recorded by updating an edit flag for the row. As discussed previously, this may take the form of a metadata flag associated with the row (such as a row identifier in a list of edited rows) or a value in an "edited" column in the row. By updating the edit flag to reflect the row edit, the resynchronization controller enables the per-row resynchronization process to send the edit to the target server while skipping rows that were not edited during the connection lapse. In some embodiments, the edit flag may be a binary measurement. In other words, a row may either be recorded as having received one or more edits or not recorded as having received any edits. For this reason, block 206 may not be necessary in some embodiments if the particular row had already been edited during the connection lapse. However, in some embodiments, the resynchronization controller may determine that the edit detected in block 204 is actually reversing of a prior edit to the row, bringing the row back to the condition it was in before the connection lapse. In this situation, no update to the row in the target database may be necessary, and block 206 may include removing an edit flag that was recorded when the row was first edited.

In addition to updating the edit flag for the particular row in block 206, the detected edit is also recorded in block 208 in which the resynchronization controller increments primary edit counters for the table. In some embodiments, for example, a resynchronization controller may increase a primary counter for the entire table by 1, reflecting the fact that a row (or another row) in the table was edited. In some embodiments, the resynchronization controller may also increase a primary counter for a sub table in the table. In other words, the resynchronization controller may maintain a primary counter for a group of rows within the table that is logically separate from the remainder of the rows in the table. This may be beneficial, for example, if the table is formally separated into logical partitions, or if the table is simply so large that dividing the table into groups of rows increases the efficiency of per-row resynchronization. In these embodiments, block 208 may also include increasing an edit counter for the sub table (e.g., partition table) in which the particular row is found.

In some embodiments, a benefit of the primary edit counter may be to inform the resynchronization controller of the number of rows that have been edited since the connection lapse. For this reason, block 208 may be unnecessary if the particular row had already been edited prior to block 204. In those instances, the applicable counters would already have been incremented when the row was originally edited, and thus would already reflect the edit to the row. However, as discussed above with respect to block 206, the resynchronization controller may determine that the edit detected in block 204 is actually reversing of a prior edit to the row, bringing the row back to the condition it was in before the connection lapse. In this situation, no update to the row in the target database may be necessary. For this reason, block 208 may be unnecessary; rather, the primary edit counters may be decremented to account for the row reverting to the pre-lapse value.

In block 210, the resynchronization controller detects that the connection between the source database and the target database has been restored. In some embodiments, this may occur by one of the methods discussed with respect to detecting the connection lapse in block 202. For example, the source database may receive a ping from the target database, indicating that the two databases are capable of communicating again.

At this point the resynchronization controller may begin per-row resynchronization, but may continue to monitor client edits during the resynchronization process. Thus, the resynchronization controller may detect an edit during resynchronization in block 212. Because connection has been restored between the source database and target database, the edit detected in block 212 may be pushed to the target database as part of the standard replication process.

However, in some instances the edit detected in block 212 may not be properly populated on the target database. Thus, in block 214, the resynchronization controller determines whether the edit detected in block 212 was successfully pushed to the target database. There may be several reasons why an edit may not be successfully populated in the target database. For example, some client edits cause cascading edits on other rows that impact multiple tables or files that depend upon the row that was edited by the client. These cascading impacts are sometimes referred to as "referential integrity cascading." In some database systems, referential integrity constraints prevent some edits with cascading from being sent to a locked target database. Thus, some embodiments of the present disclosure may disable enforcement of some or all referential integrity constraints during resynchronization.

If the resynchronization controller determines that the edit was successfully pushed to the target database, the resynchronization controller proceeds to block 216, in which the resynchronization controller removes any prior edit flags for the row and edit counters that were incremented due to a previous client edit to the row. A row for which an edit was detected in block 212 may have a previous edit flag if the row was also edited during the connection lapse (for example, if the row edited in 212 was the same row edited in 204). For the same reason, the prior edits to a row may also have contributed to the edit counters for the row's table or sub table (for example, as part of block 208). However, if block 212 is the first time the row has been edited since the beginning of the connection lapse, the row would likely not have any pre-existing edit flags and would not have been likely to contribute to edit counters.

If a row had been previously edited, on the other hand, block 216 may be useful at this stage. For example, if the row edited in block 204 was the same row edited in block 212, and if the resynchronization controller determines in block 214 that the row was successfully pushed to the target as part of the standard replication process, then the data in the row at the source database and target database would already be in sync. Therefore, no further work for the row would be necessary during resynchronization, which could be taken advantage of to increase the efficiency or the remaining resynchronization process. In order, to take advantage of that efficiency, the edit flag that was updated in 206 would be removed in block 216 to avoid reliance on it slowing down resynchronization. Similarly, the edit counters that were incremented in block 208 due to the edit from block 204 would also be removed in block 216.

However, if the resynchronization controller determines, in block 214, that the client edit detected in block 212 was not successfully pushed to the target database, the resynchronization controller proceeds to update an edit flag for the row in block 218. In some embodiments, this edit flag may take the same form as the edit flag updated for the previously edited row in block 206. For this reason, if the row edited in block 212 is the same row that was previously edited in block 204, then the edit flag for that row may already indicate that the row has been edited. In this situation, block 218 could be skipped.

In block 220, the resynchronization controller also increments the edit counters for the row that was edited in block 212. Based on the embodiment and the circumstances, this could take several forms. For example, if the edited row was a member of a partition table, the edit counters updated in block 220 may include an edit counter that tracks the number of rows in that partition table that have client edits that are not yet synchronized with the target database. Similarly, the edit counters updated in block 220 may also include an edit counter for the entire table in which the row is located. Both these edit counters may be referred to as "primary edit counters," because they record the total number of rows that have been edited since the start of the connection lapse that was detected in block 202. For this reason, if the row that was edited in block 212 had already been edited (for example, if the row edited in block 212 was the same row that was edited in block 204), then the primary edit counters may already reflect edits to those rows, in which case block 220 may not increment the primary edit counters further.

However, block 220 may also include incrementing a secondary edit counter for either a table or sub table (e.g., a partition table). In some embodiments, a secondary edit counter may be useful for recording how many new edits occurred during per-row resynchronization to ensure that those edits are also sent to the target database before resynchronization is complete. If, for example, per-row resynchronization analyzes and synchronizes rows in order of ascending row number, a resynchronization controller may start resynchronization at row 001 and proceed toward row 500. If an edit to row 120 is detected at block 212, but the resynchronization controller has already proceeded to synchronize rows 001 through 400, the edit to row 120 may not be synchronized before the resynchronization controller has "finished" per-row resynchronization for the table when it finishes row 500. However, by incrementing a secondary edit counter at block 220, the resynchronization controller may record that a row was edited during per-row resynchronization. In the above example, that secondary edit counter could be reviewed after synchronizing row 500, at which point the resynchronization controller would determine that an edit made during resynchronization needs to be sent to the target. The resynchronization controller may then begin another "round" of per-row resynchronization, during which the edit detected in block 212 may be sent to the target database. More information regarding secondary edit counters and subsequent rounds of per-row resynchronization is provided in the discussion of FIG. 3.

After the edit that was detected in block 212 is sent to the target database, the applicable flags and counters for the edit may be removed in block 216. This may be helpful, in some embodiments, to keep an updated estimate of the number of edits still remaining to be sent to the target database. However, in some embodiments, the number of remaining edits may be tracked differently. For example, some embodiments may have a separate "resynchronization progress" metric, such as tracking the number of edits sent to the target, or recording the IDs of rows that are sent to the target. In these embodiments, a comparison of the edit flags and counters (e.g., the flags and counters updated in blocks 218 and 220) and the resynchronization-progress metric may be used to determine the extent of remaining per-row resynchronization.

Once all edits have been sent to the target, the resynchronization controller detects completion of resync in block 222. Because the resynchronization controller has also detected that the connection between the source database and the target database has been restored in block 210, the target database could be unlocked at this point, and standard replication processes may resume. For this reason, the resynchronization controller may then cease the monitoring method 200 in block 224.

As mentioned in the discussion of FIG. 2, some embodiments of the present disclosure may involve performing more than one round or per-row resynchronization of a table (or sub table) to ensure that all client edits to the table are sent to the target database. This may be beneficial, for example, when a client edits the table during resynchronization, but the edit is not able to be replicated on the target database through standard replication procedures. This may also be beneficial, for example, if a row is skipped during per-row resynchronization because a client is in the process of editing the row when a resynchronization controller attempts to send the row to the target. In either case, the edits may remain when a resynchronization controller finishes proceeding through the rows of the table.

Figure 3:
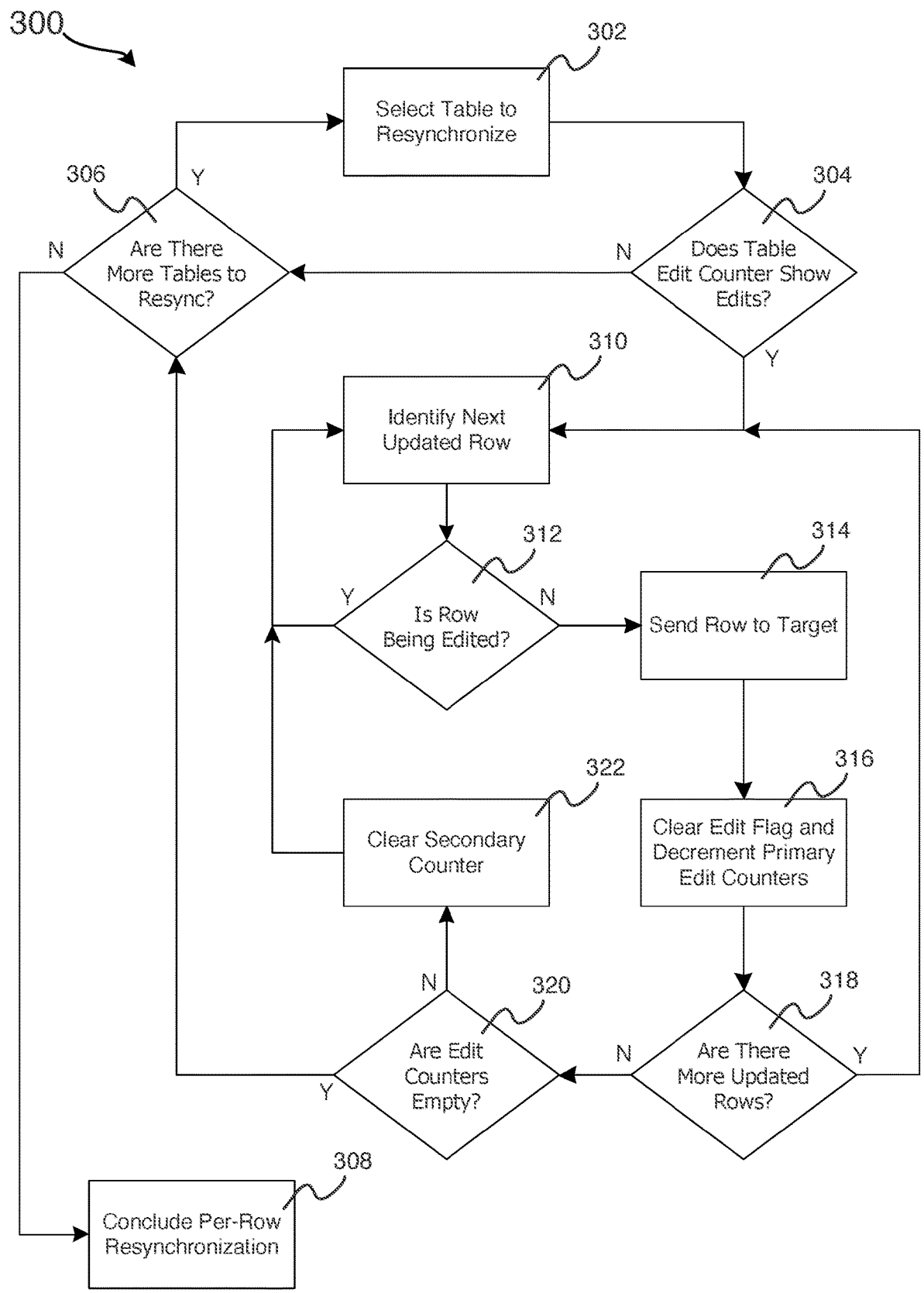
FIG. 3 depicts an example method of performing multiple rounds of per-row resynchronization, in accordance with embodiments of the present disclosure.

FIG. 3 depicts an example method 300 of performing multiple rounds of per-row resynchronization, in accordance with embodiments of the present disclosure. Similar to method 100, method 200 may be performed by a resynchronization controller that is managing a set of two or more replicated databases. This resynchronization controller may take the form of a computer system such as computer system 400, or a more specialized system. In some embodiments, the resynchronization controller that performs method 300 may be the same, or a different component that performs other aspects of per-row resynchronization, such as some of the operations of methods 100 of FIG. 1 and 200 of FIG. 2.

Method 300 begins in block 302, in which a resynchronization controller selects a table in a source database to resynchronize. Block 302 may occur, for example, by scanning a list of all tables in the source database that are replicated to the target database and selecting the first (or next) table (for example, based on ascending table ID number). As used within method 300, the term "table" may refer to an entire table, or a sub table (e.g., a partition table). Thus, in block 302, the resynchronization controller may scan a table for a partition table to resynchronize, rather than scanning an entire database (or database file) for an entire table to resynchronize. Such a partition table may be grouped by topic. For example a partition table may include all rows that provide sales number for a particular product in a table that provides sales numbers for all of a company's products. Such a partition table may also be grouped based on the number of rows. For example, in a table with 10,000,000 rows, a resynchronization controller may organize the table into partition tables of 100,000 rows.

In block 304, the resynchronization controller determines whether a table counter for the table shows that the table has been edited. This table counter, for example, may take the form of a primary table counter, such as a sub-table counter or table counter discussed in blocks 220 and 208. In some embodiments, block 304 may simply determine whether the table counter discloses that there are 0 edited rows in the table or that there are more than 0 edited rows. In this way, block 304 may be a binary consideration. However, in some embodiments block 304 may also include analyzing the number of rows reported by the counter. For example, in some embodiments a resynchronization controller may determine that the table counter discloses 500,000 rows that have been edited since a connection between a source database and a target database has lapsed. In this embodiment, the resynchronization controller may be capable of estimating how long per-row resynchronization is likely to take based on the disclosed number of rows. Further, in some embodiments a resynchronization controller may use the number of rows disclosed by the edit counter to determine when per-row resynchronization is complete. For example, if the edit counter discloses 50 row edits, the resynchronization controller may determine to stop resynchronizing the table after it has sent the 50th edited row to the target database, even if there are 400,000 rows that have not yet been analyzed.

If the resynchronization controller determines in block 304 that the table edit counter does not show any edited rows, the resynchronization controller proceeds to block 306 to determine if there are further tables (i.e., sub tables or entire tables) that could be scanned. In some embodiments, this determination may include checking whether there are more partition tables in the overall table or checking whether there are more tables in the overall database. If no further tables are identified, the resynchronization controller concludes per-row resynchronization in block 308. However, if at least one table is identified, the resynchronization controller returns to block 302, at which another table is selected, and then proceeds again to block 304.

If the resynchronization controller determines in block 304 that a table edit counter does show edited rows, the resynchronization controller proceeds to identify the next updated row in block 310. Block 310 may include scanning through a list of rows in the table for the next row (here, the first row) for which an edit flag reports that the row has been edited. For example, if each row in a table contains an "Edited?" field, the resynchronization controller may scan that field in the first row, then the second row, and so on until it detects a positive value (i.e., an edit flag) in the field (e.g., "yes," "true," "1.0," "x," or "√"). Similarly, if a metadata file associated with the table contained a list of row identifiers that have been edited (i.e., edit flags), the resynchronization controller may scan the list for the first row identifier.

Because per-row resynchronization enables the source database to (and table) to remain unlocked during resynchronization, it is possible that any row in the table is being edited by a database client during method 300. Further, because sending a row that is currently being edited to a target database may result in the edit not being sent to the target, sending the row may result in the source and sink databases not being synchronized. For this reason, once the next updated row is identified in block 310, the resynchronization controller determines whether that row is currently being edited by a database client in block 312. In some embodiments, for example, this determination may take the form of analyzing the database to determine whether any clients are accessing any fields in the row. However, this determination may also take the form of determining whether the row has been locked due to the client editing the field, preventing the row from being sent until the lock is released.

If the row is currently being edited, method 300 includes the resynchronization controller temporarily skipping that row and proceeding to locate the next updated row in block 310. This may result in a performance improvement, because the resynchronization controller can perform per-row resynchronization without waiting for the database client to finish editing the row. This performance improvement may be particularly significant if, for example, the database client takes the form of a computer system or process with instructions to edit each row of the table in order. In this example, both the database client and the resynchronization controller may be proceeding through the table in the same order. Thus, if the resynchronization controller is unable to skip a row that is being edited, the resynchronization controller may end up repeatedly waiting for the database client to edit row after row. The potential negative effects of waiting for a client to edit a row may also be exacerbated if the client takes the form of a human user, who may be uncertain of what value to change or what value to insert, increasing the time spent on the edit.

If the resynchronization controller determines in block 312 that a selected row is not being edited, the resynchronization controller sends the row to the target database in block 314. In some embodiments, this may include sending the entire row from the source database to replace the corresponding row in the target database. In some embodiments, this may include sending only the edited fields to the target database, or detecting which fields in the target database are not the same as in the source database, and sending only those detected fields.

Once the edited row is sent to the target database in block 314, the resynchronization controller clears the edit flag for the row and decrements applicable primary edit counters for the row. Clearing the edit flag for the row may be beneficial because it may prevent the resynchronization controller from unnecessarily analyzing the row and resending the row to the target in future rounds of per-row resynchronization (for example, when the resynchronization controller repeats resynchronization to process edited rows that were skipped as part of block 312).

Decrementing the primary edit counters in block 316 may vary depending on the embodiment of per-row resynchronization and the nature of the table being resynchronized. For example, if method 300 is being performed on a partition table, a primary edit counter for the partition table and a primary edit counter for the containing table may both be decremented. In some embodiments, decrementing the primary edit counters may be used to estimate the amount of time remaining before per-row resynchronization is competed. Decrementing the primary edit counters may also be used to estimate the amount of progress made on resynchronization, which may be beneficial if resynchronization needs to be paused and resumed later or if resynchronization is interrupted by system problems.

However, in some embodiments of per-row resynchronization, primary edit counters for tables may not be decremented during resynchronization. For example, some embodiments may maintain a separate progress metric that reports the number of rows that have already been resynchronized, or even the IDs of rows that have been resynchronized. In those embodiments, comparing the progress metric with the primary edit counters may provide sufficient information regarding progress and remaining time before completion. In these embodiments, block 316 may not include decrementing primary edit counters.

After performing block 316, the resynchronization controller proceeds to block 318, in which it determines whether there are more updated rows in the table to resync as part of the current round of per-row resynchronization. This determination may take several forms. For example, if the resynchronization controller is performing processing the rows of the table in ascending order, block 318 may determine whether the row that was sent to the target in block 314 is the last row in the table. If the row is not the last row, then more edited rows may remain. As another example, this the resynchronization controller may also determine whether the same number of rows that were identified in a primary counter for the table have been sent to the target database.

If the resynchronization controller determines that there are more updated rows in the table to process, the resynchronization controller returns to block 310 to select the next updated row. However, if the resynchronization controller determines, for example, that it has reached the last row in the database, it proceeds to block 320 to determine whether the edit counters are empty.

The determination of block 320 could also take several forms, depending on the embodiment. For example, a resynchronization controller may analyze a secondary counter for the table, such as a secondary counter discussed with respect to block 220 of FIG. 2. This secondary counter may report whether any edits have been made to the table since the start of resynchronization. For example, if row 300 is edited by a database client after the resynchronization controller has already processed rows 100-500, the edit to row 300 may be recorded in a secondary counter for the table. In this embodiment, analyzing the secondary counter would show that client edits that may not have otherwise been detected are yet to be sent to the target database.

In embodiments of per-row resynchronization in which primary edit counters are decremented in block 316, a resynchronization controller may also (or alternatively) determine in block 320 whether the primary counter is empty. This may be beneficial for example, because it may identify whether any rows that had been edited during a connection lapse were skipped in response to detecting, in block 312, that they were being edited by a client. In some embodiments, however, block 320 may be limited to analyzing a secondary edit counter.

If the resynchronization controller determines in block 320 that an edit counter is not empty, the resynchronization controller clears the secondary counter for the table in block 322 before beginning another round of per-row resynchronization in block 310. Clearing the secondary counter before beginning another round of resynchronization may be beneficial because it prepares the secondary counter to be used again in the next round. If, for example, the secondary counter is cleared before a third round of resynchronization, and the secondary counter is still empty during the third round of resynchronization, a resynchronization controller could determine that no client edits were made to the database during the third round.

If, however, the resynchronization controller determines in block 320 that the edit counters are empty, the resynchronization controller may conclude that resynchronization of the table is complete. If the table is an entire table (as opposed to a partition table), the table on the target database may be unlocked at this time. However, if the table is a sub table (e.g., a partition table or group of rows), the resynchronization controller may need to confirm that all other sub tables in the containing table have been resynchronized before the sub tables are unlocked. Once the resynchronization controller determines that resynchronization for the table is complete, it proceeds to block 306 to determine whether there are further tables (e.g., partition tables or complete tables) to resynchronize. If no tables remain, the resynchronization controller concludes per-row resynchronization for the database in block 308.

It is of note that the majority of examples provided within the present disclosure are described from the perspective of tables with entries organized into rows. For this reason, the resynchronization methods discussed herein are also termed per-row resynchronization for the sake of simplicity. However, a person of skill in the art will appreciate that the orientation of the entities in the overall table is not vital to the embodiments of this disclosure. For this reason, the embodiments of this disclosure could equally be applied on tables in which entries are organized into columns, rather than rows.

Figure 4:
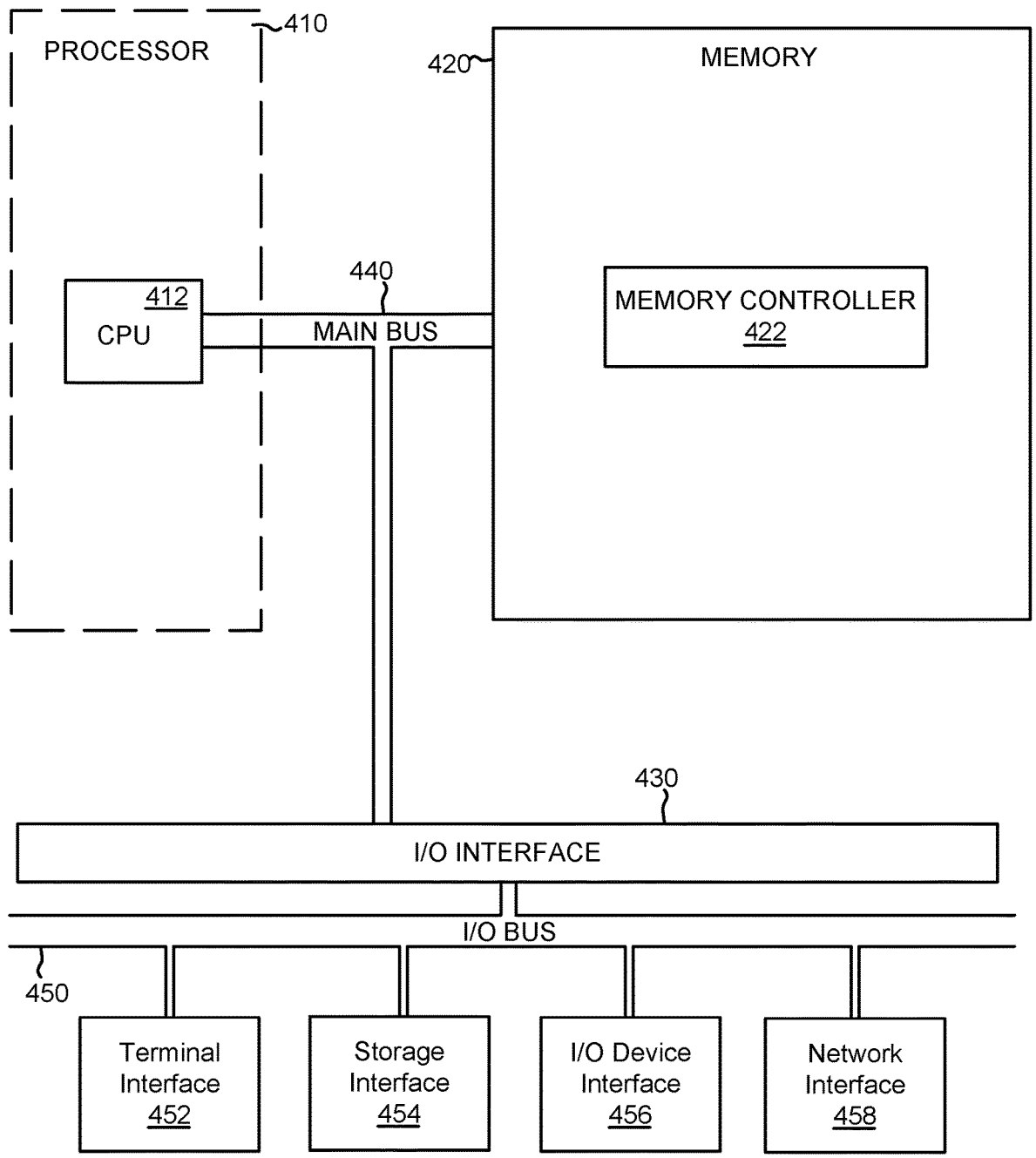
FIG. 4 depicts the representative major components of a computer system that may be used in accordance with embodiments.

FIG. 4 depicts the representative major components of an example Computer System 401 that may be used in accordance with embodiments of the present disclosure. The particular components depicted are presented for the purpose of example only and are not necessarily the only such variations. The Computer System 401 may include a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may include one or more CPUs 412. The Processor 410 may additionally include one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may include one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may include a Memory Controller 422 and one or more memory modules for temporarily or permanently storing data (not depicted). In some embodiments, the Memory 420 may include a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may include an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may include the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of controlling resynchronization of a source database and a target database comprising:
   detecting that a connection between the source database and the target database has been restored;
   beginning, in response to the detecting, a first round of database resynchronization;
   determining that a row in a first table on the source database is being edited by a database client;
   incrementing, in response to the determining, a secondary edit counter, wherein the secondary edit counter records a number of rows that have been edited since the connection has been restored;
   detecting that the secondary edit counter is not empty;
   clearing the secondary edit counter; and
   beginning, in response to the detecting that the secondary edit counter is not empty, a second round of database resynchronization.

2. The method of claim 1, wherein the method further comprises:
   detecting, prior to the detecting that the connection has been restored, a second edit to a second row in the first table; and
   incrementing, based on the detecting the second edit, a first primary edit counter for the first table, wherein the first primary edit counter reports a number of rows in the first table that have been edited after the connection between the source database and the target database lapsed and before the connection was restored.

3. The method of claim 2, further comprising:
   sending the second row from the source database to the target database;
   decrementing, based on the sending, the first primary edit counter for the first table.

4. The method of claim 1, further comprising:
   detecting, after the detecting that the connection has been restored, a second edit to a second row; and
   incrementing, based on the detecting the second edit, the secondary edit counter for the first table.

5. The method of claim 1, further comprising:
   selecting a second table to resynchronize;
   determining that a primary edit counter for the second table reports that no rows of the second table have been edited; and
   skipping, based on the determining, resynchronization of the second table.

6. The method of claim 1, further comprising temporarily blocking the enforcement of unique key indexes on the target database.

7. The method of claim 1, further comprising temporarily blocking the enforcement of referential integrity constraints on the target database.

8. The method of claim 1, further comprising:
   temporarily skipping, based on the determining, sending the row to the target database.

9. A system comprising:
   a processor; and
   a memory in communication with the processor, the memory containing program instructions that, when executed by the processor, are configured to cause the processor to:
   detect that a connection between a source database and a target database has been restored;
   begin, in response to the detecting that the connection has been restored, a first round of database resynchronization;
   detect, after the detecting that the connection has been restored, an edit to a row in a first table on the source database;
   increment, based on the detecting the edit, a secondary edit counter for the first table, wherein the secondary edit counter reports a number of rows in the first table that have been edited after the connection was restored;

detect that the secondary edit counter is not empty;
clear the secondary edit counter such that the secondary edit counter is empty; and
begin, in response to the detecting that the secondary edit counter is not empty, a second round of database resynchronization.

10. The system of claim 9, wherein the instructions are further configured to cause the processor to:
detect, prior to the detecting that the connection has been restored, a second edit to a second row in the first table; and
increment, based on the detecting the second edit, a first primary edit counter for the first table, wherein the first primary edit counter reports a number of rows in the first table that have been edited after the connection between the source database and the target database lapsed and before the connection was restored.

11. The system of claim 10, wherein the instructions are further configured to cause the processor to:
send the second row from the source database to the target database;
decrement, based on the sending, the first primary edit counter for the first table.

12. The system of claim 9, wherein the instructions are further configured to cause the processor to:
identify an edit flag for a second row in the first table on the source database;
determine that the second row is being edited by a database client; and
temporarily skip, based on the determining, sending the second row to the target database.

13. The system of claim 9, wherein the instructions are further configured to cause the processor to temporarily block the enforcement of unique key indexes on the target database.

14. The system of claim 9, wherein the instructions are further configured to cause the processor to:
identify, based on the detecting that the connection has been restored, an edit flag for a second row in a first table on the source database;
send, based on the identifying, the second row from the source database to the target database; and
clear, based on the sending, the edit flag for the second row.

15. A computer program product, the computer program product comprising a computer readable storage medium having program instructions embodied therewith, the program instructions executable by a computer to cause the computer to:
detect that a connection between a source database and a target database has been restored;
begin, in response to the detecting, a first round of database resynchronization;
identify a first edit flag for a first row in a first table on the source database;
determine that the first row is being edited by a database client;
increment, in response to the determining, a secondary edit counter, wherein the secondary edit counter records a number of rows that have been edited since the connection has been restored;
temporarily skip, based on the determining, sending the first row to the target database;
detect that the secondary edit counter is not empty;
clear the secondary edit counter such that the secondary edit counter displays a zero value; and
begin, in response to the detecting that the secondary edit counter is not empty, a second round of database resynchronization.

16. The computer program product of claim 15, wherein the program instructions further cause the computer to:
detect, prior to the detecting that the connection has been restored, a first edit to the first row; and
increment, based on the detecting the first edit, a first primary edit counter for the first table, wherein the first primary edit counter reports a number of rows in the first table that have been edited after the connection between the source database and the target database lapsed and before the connection was restored.

17. The computer program product of claim 16, wherein the program instructions further cause the computer to:
send, during the second round of database resynchronization, the first row from the source database to the target database; and
decrement, based on the sending, the first primary edit counter for the first table.

18. The computer program product of claim 15, wherein the program instructions further cause the computer to:
detect, after the detecting that the connection has been restored, a second edit to a third row; and
increment, based on the detecting the second edit, the secondary edit counter for the first table.

19. The computer program product of claim 15, wherein the program instructions further cause the computer to temporarily block the enforcement of unique key indexes on the target database.

20. The computer program product of claim 15, wherein the program instructions further cause the computer to:
identify, based on the detecting, a second edit flag for a second row in the first table on the source database;
send, based on the identifying, the second row from the source database to the target database; and
clear, based on the sending, the second edit flag for the second row.

* * * * *